United States Patent [19]

Koike

[11] Patent Number: 5,584,452
[45] Date of Patent: Dec. 17, 1996

[54] HARNESS CLIP

[75] Inventor: Takashi Koike, Yokohama, Japan

[73] Assignee: Kato Hatsujyo Co., Ltd., Japan

[21] Appl. No.: 340,741

[22] Filed: Nov. 16, 1994

[30] Foreign Application Priority Data

Dec. 22, 1993 [JP] Japan ............................. 5-073556 U

[51] Int. Cl.⁶ ............................................. F16L 3/08
[52] U.S. Cl. ........................ 248/74.3; 24/16 PB; 248/73
[58] Field of Search ........................... 248/70, 74.3, 71, 248/73, 56; 174/48; 24/16 PB, 458, 30.5 P, 17 AP

[56] References Cited

U.S. PATENT DOCUMENTS

| | | | |
|---|---|---|---|
| 2,969,216 | 1/1961 | Hallsey | 248/71 |
| 3,550,219 | 12/1970 | Van Buren | 24/73 |
| 4,435,881 | 3/1984 | Yamaguchi et al. | 24/16 PB |
| 4,572,466 | 2/1986 | Yamaguchi et al. | 248/73 |
| 4,632,343 | 12/1986 | Watanabe | 248/73 |
| 4,735,387 | 4/1988 | Hirano et al. | 248/71 |
| 4,919,373 | 4/1990 | Caveney et al. | 248/74.3 |
| 4,944,475 | 7/1990 | Ono et al. | 248/74.3 |
| 5,385,321 | 1/1995 | Kume et al. | 24/16 PB |

FOREIGN PATENT DOCUMENTS 2380456  9/1978  France ............................... 248/74.3

Primary Examiner—Karen J. Chotkowski
Assistant Examiner—Gwendolyn Wrenn
Attorney, Agent, or Firm—Ladas & Parry

[57] ABSTRACT

A harness clip is so arranged that a band portion 6 is formed to extend on the front face side of a flange portion 2 having elastic wings 7 on the both side surfaces thereof, a shaft portion 3 projects on the rear face side of the flange portion, a latch stopper surface 13 is formed on one surface of the band portion 6, stopper legs 5 elastically biased toward a peripheral edge 101 of a mount hole in a panel 10 are formed on the both side surfaces of the shaft portion 3, a through hole 8 is formed through the flange portion 2, stopper claws 9 to mesh with the latch stopper surface 13 are provided inside the through hole 8, a band holding wall 4 stands as suspended downward from the distal end of the shaft portion 3, a lead hole 12 is formed through the band holding wall 4, the lead hole 12 and through hole 8 are formed below the shaft portion 3 and stopper legs 5, a band catching portion 30 is formed to project from the lower edge of the band holding wall 4 so that the upper surface thereof is on a same plane as the lower surface of the lead hole 8, and a lock piece 31 to mesh with the latch stopper surface 13 is formed to project on the upper surface of the band catching portion 30.

3 Claims, 6 Drawing Sheets

HARNESS CLIP

BACKGROUND OF THE INVENTION

1. Field of the Invention

The present invention relates to a harness clip for mounting and fixing a harness, which is to be set, for example, inside a car or the like, to a mount member such as a panel.

2. Related Background Art

Examples of conventional harness clips are those disclosed in Japanese Laid-open Patent Application No. 59-219508, Japanese Laid-open Utility Model Application No. 60-189682, and Japanese Laid-open Utility Model Application No. 63-22410.

The harness clip as disclosed in Japanese Laid-open Patent Application No. 59-219508 is composed of a flange portion, a leg portion having a stopper leg on one side of the flange portion, and a band portion provided on the other side of the flange portion.

The band portion holding a harness is inserted into a through hole in the flange portion. The band portion is also inserted into an opening in a panel, so that it is urged outward against the peripheral edge portion of the opening by an elastic force of the stopper leg, thus forming the leg portion together with the stopper leg.

Also, a stopper surface with projections and depressions of the band portion engages with the peripheral edge portion of the aperture to be fixed thereby.

In the next place, the harness clip as disclosed in Japanese Laid-open Utility Model Application No. 60-189682 is constructed in such a manner that a pass hole is formed in a flange portion (base) of harness clip (cable holder), an insert hole is also formed near a base portion of one elastic leg of anchor shape, and a band plate is set through the pass hole and insert hole so as to engage teeth formed on the band plate with the peripheral edge portion of the insert hole, thus being stopped there.

Further, the harness clip as disclosed in Japanese Laid-open Utility Model Application No. 63-22410 is so arranged that a band portion is set through a through hole formed in a flange portion of harness clip and through a hole formed at the central position of a column portion extending from the flange portion, whereby the band portion is held by two point support.

The harness clip of No. 59-219508, however, had the following problem. When set onto the panel, the band portion near the opening is urged outward against the peripheral edge portion of the opening by the elastic force of the stopper leg to be fixed there. In that case, the band portion is held only at a point of the peripheral edge portion. Thus, the leading end of the band portion is free to be curved, thus being easily bent.

Consequently, the bent leading end of the band portion would interfere with the periphery of the mount hole in the panel in mounting the harness clip to the panel, resulting in lowering workability of mounting.

Also, even after the mounting of harness clip, the bent leading end of the band portion would obstruct mounting of other components, thus lowering the workability.

Also, the harness clip of No. 60-189682 had the following problem. Since the insert hole is formed near the base portion of one elastic leg, setting the band plate therethrough would substantially disable elastic deformation of the one elastic leg whereby only the other elastic leg can function, making difficult to insert it into the mount hole in the panel.

Further, the harness clip of No. 63-22410 is so arranged that a rigid stopper projection is formed in the through hole in the flange portion and that stopper claws projected on the band portion are elastically deformed to engage with the stopper projection. Thus, the band portion is considerably thick in the portion of the stopper claws.

Since the thick band portion is set through the hole formed through the column portion, this hole needs to be constructed in increased dimensions. Further, because the anchor stopper legs are formed to project from the column portion and the band portion passes between the pair of stopper legs, the distance between the stopper legs needs to be largely set, thus increasing the dimensions of members. Accordingly, there was a problem that compact design was not possible as a whole.

SUMMARY OF THE INVENTION

The present invention has solved the above problems in the conventional technology and an object of the invention is to provide a harness clip which can surely prevent outward opening and slip-off of the leading end portion of a band portion, which is excellent in workability when mounted onto a target member such as a panel, and which can be designed in a compact shape.

To achieve the above object, a harness clip according to the present invention is so arranged that a band portion continuously extends from a front face of a flange portion having elastic wings on two side surfaces thereof, a shaft portion projects from a rear face of said flange portion, a latch stopper surface is formed on one surface of said band portion, stopper legs are formed to project from two side surfaces of said shaft portion, said stopper legs being to be elastically urged against a peripheral portion around a mounting hole in a panel in cooperation with said elastic wings, a through hole is formed through said flange portion, an elastically deformable stopper claw to mesh with said latch stopper surface is provided inside said through hole, a band holding wall stands downward from a distal end of said shaft portion, a lead hole is formed in said band holding wall at a position matching with said through hole, said lead hole and said through hole are formed below said shaft portion and said stopper legs, a band catching portion is formed to project from a lower edge of said band holding wall toward said flange portion so that an upper surface thereof is kept at the same level as a lower surface of said lead hole, a lock piece to mesh with said latch stopper surface is formed to project on the upper surface of said band catching portion, wherein a band leading end portion of said band portion holding a harness is led through the through hole in said flange portion and further through said lead hole with a guide of said band catching portion so as to fasten the band portion, whereby said stopper claw of the through hole comes to engage with the latch stopper surface of said band portion at a predetermined position and said lock piece also comes to mesh with the latch stopper surface at a predetermined position so as to catch the harness, and whereby the band leading end portion is kept fixed without outward opening and slip-off thereof by said stopper claw of the through hole, lock piece, band catching portion, and lead hole.

It is preferred that the latch stopper surface be formed by grooving said band portion inward within the thickness thereof.

It is also preferred that the lock piece have a height determined so as to become equal to a height of the stopper claw as elastically deformed to mesh with the latch stopper surface at the predetermined position.

The harness clip according to the present invention is so arranged that the band portion is meshed with and held by the stopper claw and the lock piece at two points located at a certain clearance in the fastened state, whereby the tension state of the band portion can be always secured throughout the entire length. Also, because the lead hole and band catching portion hold the band leading end portion over a long distance, the slip-off of the band leading end portion can be surely prevented even if the harness clip is to be set into a mount hole in a panel in a groping condition with the mount hole being on the blind side. Thus, the harness clip can be set with good workability and the band leading end portion will not be an obstruction in mounting.

Additionally, because the band catching portion and lead hole firmly catch the band leading end portion and because the lock piece meshes with the latch stopper surface of the band leading end portion to resist deformation in the slip-off direction of the band leading end portion, the harness clip is unlikely to be bent in the slip-off direction of the band leading portion, thus enhancing the strength of the entire shaft portion in this respect.

Further, after the band leading portion is set through the through hole in the flange portion and when it is inserted into the lead hole in the band holding wall, the band catching portion serves as a guide, which further improves the workability in insertion.

DESCRIPTION OF THE PREFERRED EMBODIMENT

Figure 1:
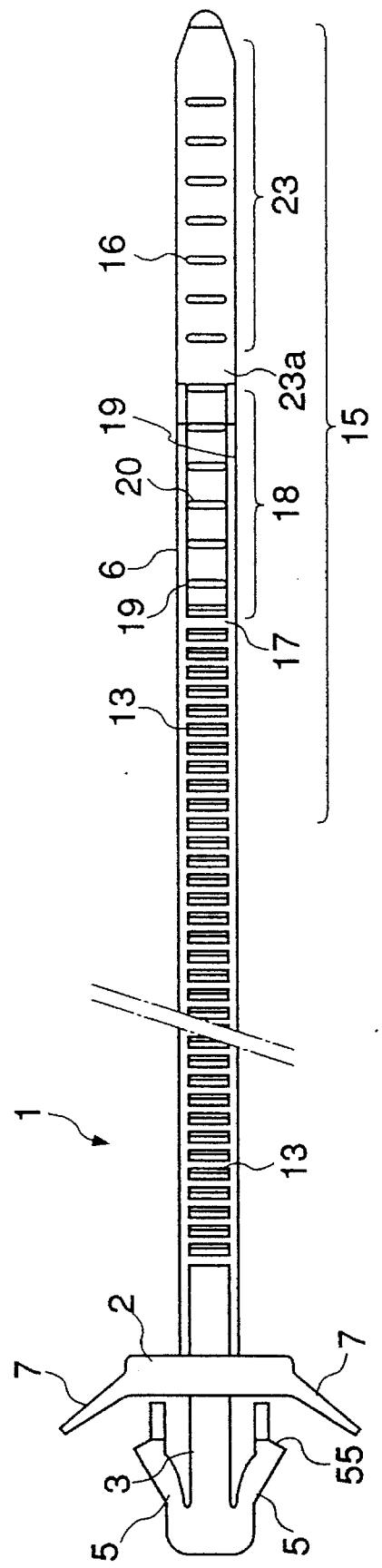
FIG. 1 is a plan view of major part to show an embodiment of the harness clip according to the present invention.

A preferred embodiment of the present invention will be described with reference to the accompanying drawings.

FIG. 1 to FIG. 8 show an embodiment of the present invention, in which reference numeral 1 designates a harness clip according to the present embodiment.

This harness clip 1 is composed roughly of a flange portion 2, a band portion 6, a shaft portion 3, a band holding wall 4, stopper legs 5, elastic wings 7, and a band catching portion 31, all of which are integrally formed of a synthetic resin.

The band portion 6 continuously extends from the front face of flange portion 2, and the shaft portion 3 projects on the rear face of flange portion 2. The band holding wall 4 stands as suspended downward from the distal end of the shaft portion 3.

A pair of elastic wings 7, 7 are provided on the two side surfaces of flange portion 2, which can be elastically deformed when coming into contact with a panel 10 of a car or the like. Also, a through hole 8 is formed through a nearly central portion of flange portion 2.

A pair of stopper claws 9, 9 elastically deformable toward the exit are formed inside the through hole 8.

Figure 4:
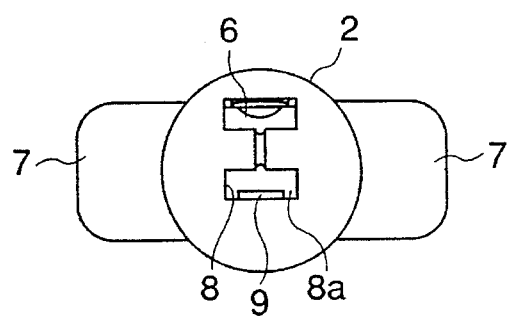
FIG. 4 is a right side view of the harness clip of FIG. 2.

As shown in FIG. 4, each stopper claw 9 is formed to project within the width to leave the both widthwise ends of the through hole 8, so that there are flat portions 8a of a predetermined width left on the both end portions.

Figure 5:
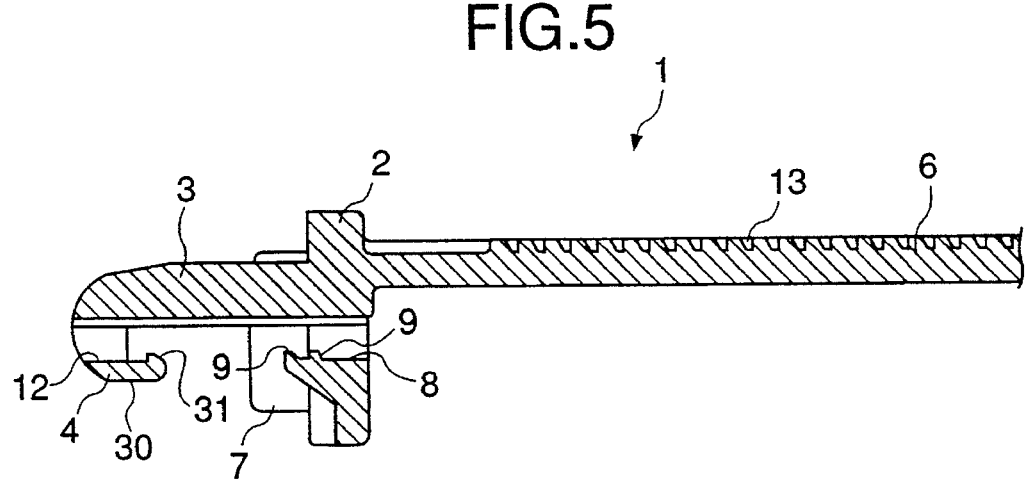
FIG. 5 is a cross sectional view of the major part of the harness clip of FIG. 1.

In the present embodiment, as shown in FIG. 5, the shaft portion 3 is formed at such a position that the upper surface of the through hole 8 and the lower surface of the shaft portion 3 are on a same plane.

Namely, the present embodiment is so arranged that the position of the shaft portion 3 is set as offset upward from the center position of the flange portion 2 in order to avoid interference between the band portion 6 and the shaft portion 3 when the band portion 6 is inserted into the through hole 8, as detailed later.

On the both side surfaces of the shaft portion 3 there are formed a pair of stopper legs 5, 5 projecting from near the distal end of the shaft portion 3 toward the flange portion 2 as opposing the pair of elastic wings 7 and elastically biased outward.

A step portion 55 is provided at the distal end of each stopper leg 5 so as to be engaged with a peripheral edge portion 101 of a mount hole 11 formed in the panel 10.

Figure 9:
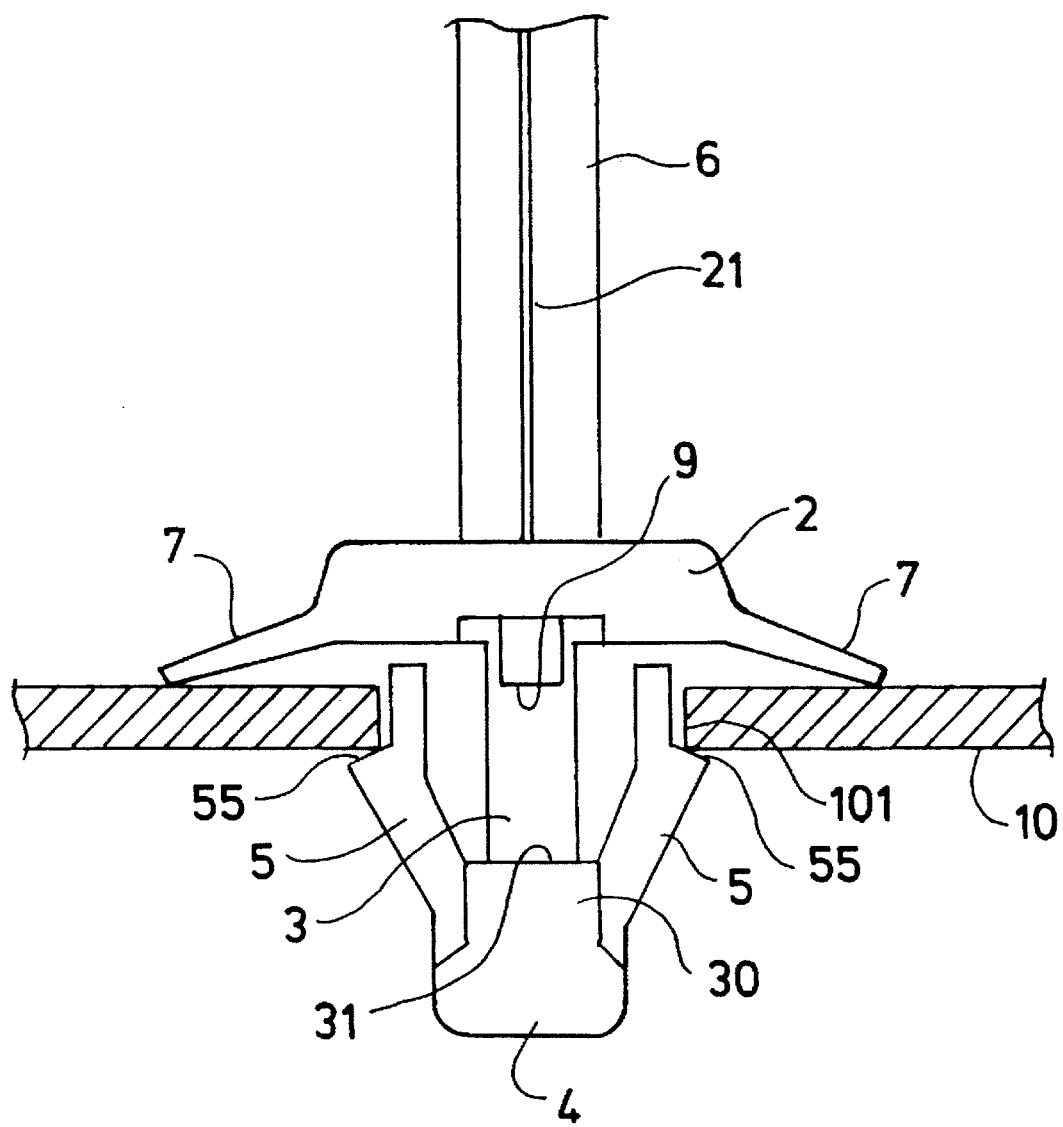
FIG. 9 is a partial plan view of the harness clip set in a panel.
Figure 10:
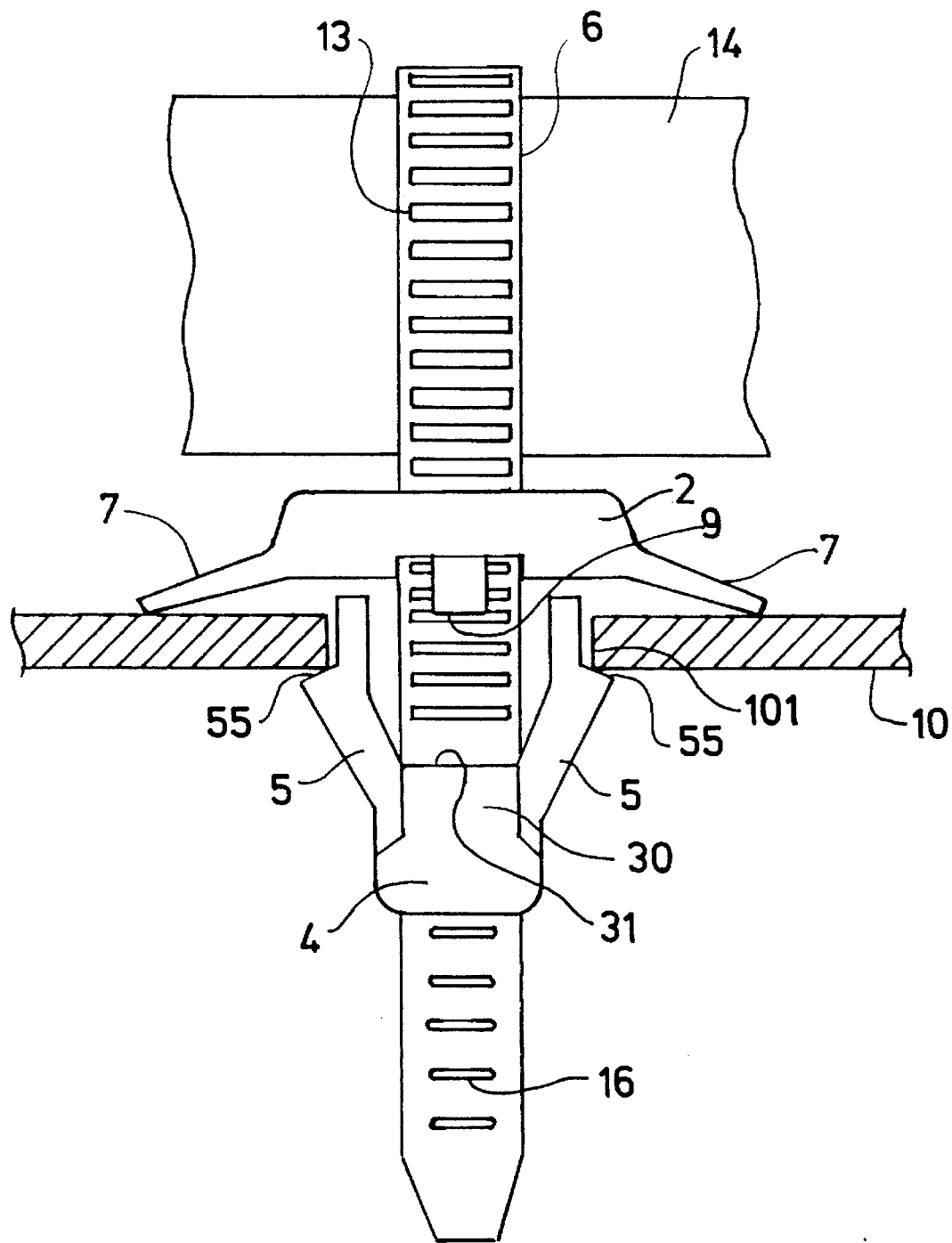
FIG. 10 is a plan view of the harness clip set in a panel while holding a harness.

When the harness clip 1 is set into the mount hole 11 in the panel 10, the stopper legs 5 and the elastic wings 7 of flange portion 2 work together to pinch the peripheral edge portion 101 of the mount hole 11 so as to fix the harness clip 1 to the panel 10, as illustrated in FIGS. 9 and 10.

The stopper legs 5 are also set at a position upwardly offset from the central position of the flange portion 2 in order to avoid interference with the band portion 6, similarly as in the case of the shaft portion 3. In the present embodiment, the lower surface of each stopper leg 5 is set on a same plane as the lower surface of the shaft portion 3.

From the distal end of the shaft portion 3, the band holding wall 4 stands as suspended downward perpendicular to the axial direction of the shaft portion 3. A lead hole 12 is formed through the band holding wall 4 at a position corresponding to the through hole 8.

Namely, the through hole 8 and lead hole 12 are formed at concentric positions in the horizontal direction.

Also, similarly as in the case of the through hole 8, the present embodiment is so arranged that the lower surface of the shaft portion 3 and the upper surface of the lead hole 12 are positioned on a same plane in order to avoid interference of the band portion 6 with the shaft portion 3 and stopper legs 5 upon insertion.

Figure 8:
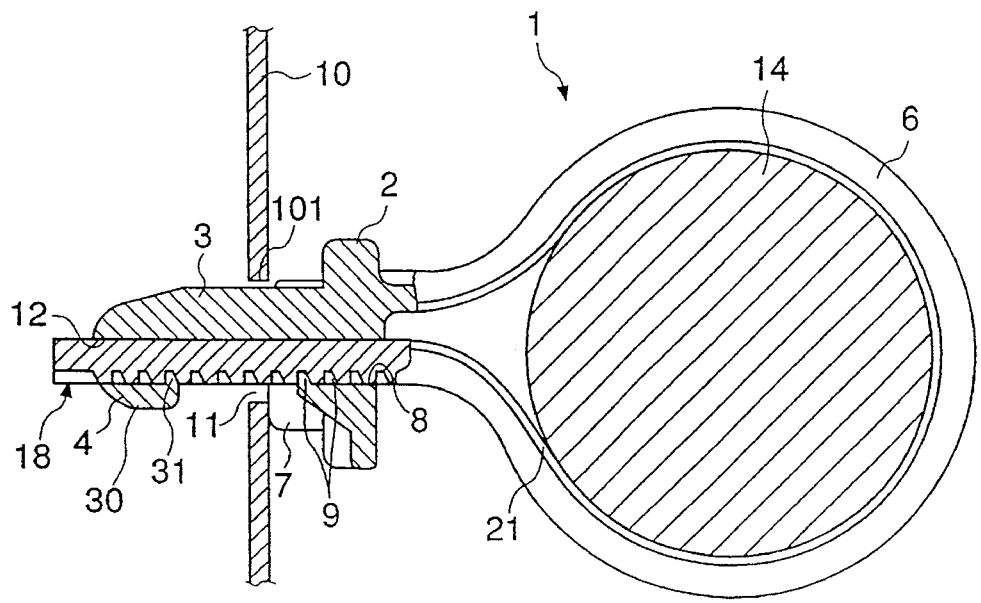
FIG. 8 is a cross sectional view of the harness clip set in a panel while holding a harness.

The band holding wall 4 is so constructed, as shown in FIG. 8, that when the band portion 6 is inserted into the through hole 8 in the flange portion and further into the lead hole 12, it can hold the leading end portion of the band portion 6.

The band catching portion 30 is formed to project from the lower end of the band holding wall 4 toward the flange 2 as being perpendicular thereto, as shown in FIG. 5 and other drawings.

The upper surface of the band catching portion 30 is set on a same plane as the lower surface of the lead hole 12.

Also, a lock piece 31 is integrally formed to project on the upper surface and at the distal end of the band catching portion 30.

The band portion 6 is formed in an elongate shape in total, in which a latch stopper surface 13 is formed in the intermediate portion on one surface thereof.

The latch stopper surface 13 is formed to have a cross section matching with those of the stopper claws 9 and lock piece 31 so as to be capable of meshing with the pair of stopper claws 9, 9 and the lock piece 31.

Figure 3:
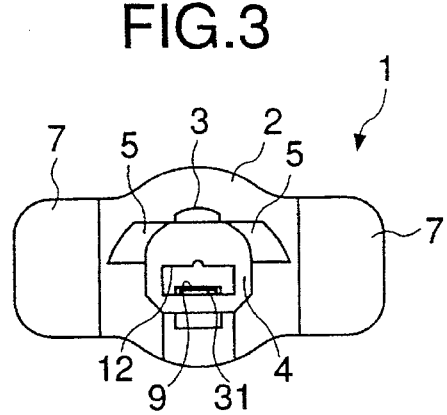
FIG. 3 is a left side view of the harness clip of FIG. 2.

As shown in FIG. 3, the lock piece 31 has a slightly shorter width than that of the stopper claws 9 and a height lower than the original height of the stopper claws 9 before engagement, so that it becomes equivalent to the height of the stopper claws 9 as elastically deformed when engaged with the latch stopper surface 13 at predetermined positions.

Also, the latch stopper surface 13 is so arranged that when the band portion 6 is inserted into the through hole 8 and thereafter into the lead hole 12 to be fastened, the latch stopper surface 13 comes into mesh with the stopper claws 9 in the through hole 8 and further into mesh with the lock piece 31 in the band catching portion 30, thereby stopping movement of the band portion 6 while holding the harness 14.

Figure 2:
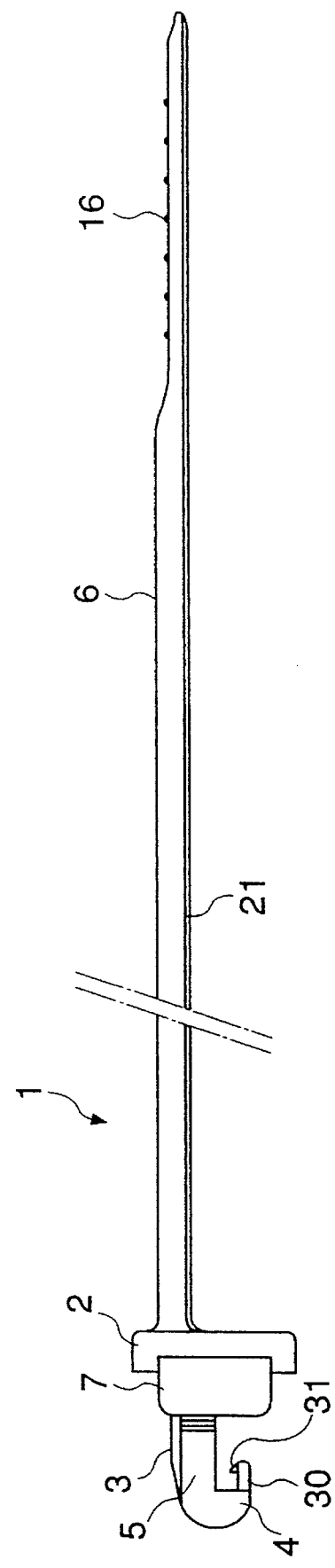
Fig. 2 is a front view of the major part of the harness clip of FIG. 1.

The latch stopper surface 13 is formed by grooving the band portion 6 toward the inside within the thickness and is determined not to project out, as shown in FIG. 2.

The band portion 6 holds the harness 14 by the surface opposite to the latch stopper surface 13.

Also, the width of the band portion 6 is determined as equal to or slightly smaller than the width of the through hole 8 and lead hole 12.

Among the band leading portion 15 of the band portion 6, as shown in FIG. 1 and FIG. 2, a fastening control portion 23 at the distal end is formed with a thickness a predetermined amount smaller than that of the portion of the latch stopper surface 13. A plurality of small projections 16 are formed at predetermined intervals in the transverse direction in the fastening control portion 23, which function as temporary stop upon mounting of harness as described later and function as slip stop in fastening the band.

Figure 6:
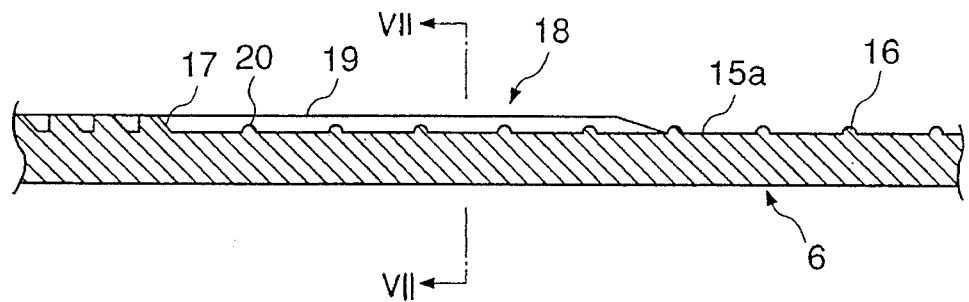
FIG. 6 is a cross sectional view of the major part of the harness clip of FIG. 1.
Figure 7:
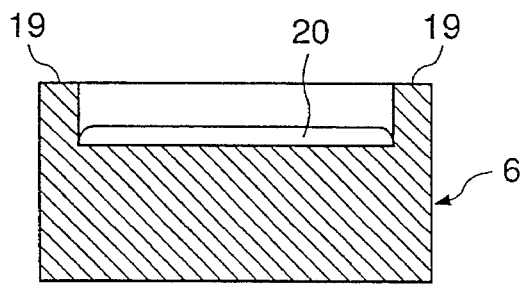
FIG. 7 is a cross sectional view along VII—VII in FIG. 6.

An insertion guide portion 18 is formed in a predetermined length, as shown in FIG. 1, FIG. 6, and FIG. 7, between the end 23a of the fastening control portion 23 on the flange 2 side and the end 17 on the fore end side of the portion where the latch stopper surface 13 is formed.

This insertion guide portion 18 is so arranged, as shown in FIG. 7, that only contact portions 19, 19 continuously formed in a predetermined width on the both widthwise ends of band portion 6 are raised to a height equal to the upper surface of the latch stopper surface 13.

Then the central portion in the width direction except for the contact portions 19, 19 is formed in the thickness equal to that of the fastening control portion 23.

The width of the both contact portions 19 are set as smaller than the width of the pair of flat portions 8a formed on the both widthwise ends of the through hole 8 in the portion where the stopper claws 9 are formed.

There are formed a plurality of small projections 20 at predetermined intervals in the width direction in the insertion guide portion 18.

Also, a linear, small projection bar 21 is continuously formed in the center portion in the transverse direction and along the longitudinal direction on the surface opposite to the latch stopper surface 13 of the band portion 6, i.e., on the surface for holding the harness 14, and a groove 22 is formed with a cross section matching with the small projection bar 21, and in the lower surface of the shaft portion 3 and in the upper surface of the through hole 8 and lead hole 12.

Next described is a way of mounting the harness clip 1 of the present embodiment.

First, as shown in FIG. 8, the harness 14 is set to be held by the surface opposite to the latch stopper surface 13 of band portion 6 and the band leading portion 15 is inserted into the through hole 8 of flange portion 2.

After that, the band leading portion 15 passing through the through hole 8 is moved forward along the lower surface of the shaft portion 3, so that the band leading portion 15 comes on the upper surface of the band catching portion 30 and then is guided by the band catching portion 30 to surely advance toward the lead hole 12 in the band holding wall 4, thereby preventing the band leading portion 15 outgoing from the through hole 8 from deviating from the lead hole 12.

On this occasion, the small projection bar 21 of the band portion 6 advances as successively engaging with the groove 22 formed on the upper surface of through hole 8, the lower surface of the shaft portion 3, and the upper surface of the lead hole 12, whereby left or right positional deviation of the band leading portion 15 from the advancing direction can be surely prevented.

Even if the band portion 6 is released after set through the lead hole 12, a small projection 16 in the fastening control portion 23 is lightly engaged with the stopper claws 9 to stop the band portion 6 from slipping off, thus functioning as temporary stop.

Next, when the fastening control portion 23 projecting out from the lead hole 12 is pulled, the insertion guide portion 18 passes through the through hole 8 in the flange portion 2 and through the lead hole 12 in the band holding wall 4, following the fastening control portion 23.

In this case, because the small projections 16 are formed in the fastening control portion 23, they serve as slip stop when pulled, facilitating and ensuring the operation.

When the insertion guide portion 18 passes, only the contact portions 19 on the both widthwise ends of the insertion guide portion 18 are in contact with the wall surfaces of the through hole 8 of flange portion 2 and with the wall surfaces of the lead hole 12 of the band holding wall 4.

Especially, inside the through hole 8 of the flange portion 2 the two contact portions 19 slide in contact with the flat portions 8a on the both ends of the through hole 8, but the central portion in the transverse direction, of the insertion guide portion 18 does not contact the stopper claws 9, which decreases the resistance upon passage and improves workability of initial insertion of the harness clip 1.

Further pulling the fastening control portion 23, the latch stopper surface 13 follows the insertion guide portion 18 to pass through the through hole 8, the band catching portion 30, and the lead hole 12, whereby the harness 14 is fastened by the band portion 6 at a certain position.

Since the band leading portion 15 of the band portion 6 projecting out from the lead hole 12 is now unnecessary, it is preferably cut at a certain position depending upon the diameter of the harness, as shown in FIG. 8.

At this fastened position, the stopper claws 9 in the through hole 8 are elastically deformed to be in firm mesh with the latch stopper surface 13 at a certain position, thereby stopping movement of the band portion 6 in the through hole 8.

Also, the band portion 6 is in a state where the latch stopper portion 13 is in mesh with the lock piece 31 of the band catching portion 30 at a certain position.

Since the band portion 6 is in the meshed and held state at two points with a certain clearance between them by the stopper claws 9 in the through hole 8 and the lock piece 31 in the band catching portion 30 in this fastened state, the tension state of the band portion 6 is always secured throughout the entire 1 length and the band portion 6 is linearly held up to the fore end.

Also, the distance in which the lead hole 12 and band catching portion 30 hold the band leading portion 15 is long.

Thus, when the clip is mounted to be fixed in the mount hole 11 in the panel 10, unintentional slip-off of the band leading portion 15 resulting in jumping-out thereof can be surely prevented even under the condition of groping operation with the mount hole 11 being on the blind side.

Additionally, the band catching portion 30 and the lead hole 12 firmly capture the band leading portion 15 and the lock piece 31 resists deformation in the slip-off direction of the band leading portion 15 while meshing with the latch stopper surface 13 of the band leading portion 15, which makes the clip hardly bent in the slip-off direction of the band leading portion 15. In this respect, the strength of the entire shaft portion 3 can be enhanced.

Further, after the band leading portion 15 is led to pass through the through hole 8 in the flange portion 2 and when it is inserted into the lead hole 12 in the band holding wall 4, the band catching portion 30 serves as a guide, which permits rapid and sure insertion.

Also, the entire clip can be designed in a compact shape, as described above, because the shaft portion 3 and elastic legs 5 are set at the position where the band portion 6 does not interfere with the shaft portion 3 and elastic legs 5 when inserted into the through hole 8 and lead hole 12 and therefore because the dimensions of the elastic legs 5 are free of the dimensions of the lead hole 12, different from the previously described conventional example.

Further, the latch stopper surface 13 of the band portion 6 is formed by cutting the band portion 6 inward within the thickness thereof so as not to project out, whereby the thickness of the band portion 6 can be made considerably smaller than those in the conventional examples and by that degree, the dimensions of the through hole 8 and lead hole 12 can be made smaller, also enabling size reduction in this respect.

Although the above embodiment showed an example in which the shaft portion 3 and stopper legs 5 were set at the position offset upward from the center position of flange portion 2, the invention is by no means limited to this example. The position of the shaft portion 3 and stopper legs 5 may be set wherever they are free of interfering with the band portion 6. Also, the lower surfaces of the stopper legs 5 do not always have to be set on a same plane as the lower surface of the shaft portion 3.

Further, the present embodiment showed the example in which the upper surfaces of through hole 8 and lead hole 12 and the lower surface of shaft portion 3 were formed at respective positions on a same plane, which is optimum in respect of workability of insertion of the band portion 6, but, without a need to be limited to it, the upper surfaces of through hole 8 and lead hole 12 may be set at positions further below the lower surface of the shaft portion 3 if necessary.

In the specification of the present application, the terms "upward", "downward", "upper surface", "lower surface", etc. are used as means of convenience for specifying the position. For example, it is needless to mention that such an arrangement that the harness clip 1 has a symmetric shape with respect to the longitudinal direction in FIG. 2 is within the technical scope of the present invention.

Also, a single stopper claw 9 can be formed depending upon the designing condition, and other modifications are possible with necessity as to the shape of other construction, the forming pitch, the forming number, etc. It is thus understood that various modifications are possible within the range not departing from the essence of the invention.

As constructed as described above, the present invention can present the following effects.

(1) When the harness clip is set in the mount hole in the panel, the band leading portion is kept not to be bent. Thus, the band leading portion is kept not to interfere with the mount hole, enabling rapid and sure mounting so as to improve the workability.

(2) Since the band portion is meshed and held at two points with a clearance therebetween by the stopper claws and the lock piece in the fastened state, the tension state of the band portion is always secured throughout the entire length. Also, because the distance in which the through hole and the band catching portion hold the band leading portion is long, the slip-off of the band leading portion can be surely prevented when the clip is set to be fixed in the mount hole of panel even under the condition of groping operation with the mount hole being on the blind side.

(3) Since the band catching portion and lead hole firmly catch the band leading portion and since the lock piece is in mesh with the latch stopper surface of the band leading portion to resist deformation in the slip-off direction of the band leading portion, the clip is unlikely to be bent in the slip-off direction of the band leading portion, thus enhancing the strength of the entire shaft portion in this respect.

(4) Since the band catching portion serves as a guide when the band leading portion is inserted into the guide hole, the insertion operation can be carried out rapidly and surely.

(5) Since the band leading portion is kept not to be bent when the harness clip is mounted into the mount hole of panel, the band leading portion is kept not to interfere with the mount hole, which enables rapid and sure mounting and which improves the workability.

(6) Since the shaft portion and stopper legs are set at the position not to interfere with the band leading portion when inserted into the through hole and lead hole and since the dimensions of the stopper legs are free of influence of the dimensions of the lead hole, different from the conventional example, the clip can be designed in a compact shape as a whole.

(7) Since the latch stopper surface of the band portion is formed by grooving the band portion inward within the thickness and is designed so as not to project out, the thickness of the band portion can be made considerably smaller as compared with the conventional examples, and by that degree, the dimensions of the through hole and lead hole can be decreased, also enabling compact design in this respect.

What is claimed is:

1. A harness clip comprising a flange portion having elastic wings on two side surfaces thereof, a band portion continuously extending from a front face of said flange portion, a shaft portion projecting from a rear face of said flange portion, wherein a latch stopper surface is formed on one surface of said band portion, and stopper legs are formed to project from two side surfaces of said shaft portion, said stopper legs adapted to be elastically urged against a peripheral portion around a mounting hole in a panel in cooperation with said elastic wings to hold the clip on the panel, said flange portion having a through hole formed therein and an elastically deformable stopper claw provided inside said through hole to mesh with said latch stopper surface, and wherein a band holding wall stands downward from a distal end of said shaft portion, a lead hole being formed in said band holding wall at a position aligning with said through hole, Such that said lead hole and said through hole are formed below said shaft portion and said stopper legs, and a band catching portion is formed to project from a lower edge of said band holding wall toward said flange portion so that an upper surface thereof is kept at the same level as a lower surface of said lead hole, said band catching portion including a guide parallel with said shaft portion and lock piece formed on the upper surface of said band catching portion to project toward the shaft portion mesh with said stopper surface, whereby a band leading end portion of said band portion for holding a harness is turned around and led through the through hole in said flange portion and further through said lead hole with said guide of said band catching portion so as to fasten the band portion, whereby said stopper claw of the through hole comes to engage with the latch stopper surface of said band portion at a predetermined position and said lock piece also comes to mesh with the latch stopper surface at a predetermined position so as to catch the harness, and whereby the band leading end portion is kept fixed without outward opening and slip-off thereof by said stopper claw of the through hole, the lock piece and guide of the band catching portion, and the lead hole of the band holding wall so as to hold the harness.

2. A harness clip according to claim 1, wherein said latch stopper surface is provided with lateral grooves on said band portion as formed by grooving inward within the thickness thereof.

3. A harness clip according to claim 2, wherein said lock piece has a height determined so as to become equal to a height of the stopper claw as elastically deformed to mesh with the latch stopper surface at the predetermined position.

* * * * *